United States Patent
Shpigelman et al.

(10) Patent No.: US 11,622,028 B2
(45) Date of Patent: Apr. 4, 2023

(54) EXPLICIT NOTIFICATION OF OPERATIVE CONDITIONS ALONG A NETWORK PATH

(71) Applicant: MELLANOX TECHNOLOGIES, LTD., Yokneam (IL)

(72) Inventors: Yuval Shpigelman, Netanya (IL); Idan Burstein, Akko (IL); Aviv Kfir, Nili (IL); Liron Mula, Ramat Gan (IL); Niv Aibester, Herzliya (IL); Gil Levy, Hod Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 169 days.

(21) Appl. No.: 17/198,292

(22) Filed: Mar. 11, 2021

(65) Prior Publication Data

US 2021/0344782 A1 Nov. 4, 2021

Related U.S. Application Data

(60) Provisional application No. 63/019,355, filed on May 3, 2020.

(51) Int. Cl.
*H04L 47/33* (2022.01)
*H04L 69/22* (2022.01)
(Continued)

(52) U.S. Cl.
CPC ............ *H04L 69/22* (2013.01); *H04L 1/0002* (2013.01); *H04L 47/12* (2013.01); *H04L 47/33* (2013.01)

(58) Field of Classification Search
None
See application file for complete search history.

(56) References Cited

U.S. PATENT DOCUMENTS 6,674,717 B1 1/2004 Duong-Van et al.
7,000,025 B1 2/2006 Wilson
(Continued)

FOREIGN PATENT DOCUMENTS

EP 2537301 B1 4/2014
EP 3902275 A1 * 10/2021
ES 2315369 T3 4/2009

OTHER PUBLICATIONS

Ramakrishnan et al., "The Addition of Explicit Congestion Notification (ECN) to IP," Request for Comments (RFC) 3168, pp. 1-63, Sep. 2001.

(Continued)

*Primary Examiner* — The Hy Nguyen
(74) *Attorney, Agent, or Firm* — Kligler & Associates Patent Attorneys Ltd

(57) ABSTRACT

A network element includes circuitry and multiple ports. The multiple ports are configured to connect to a communication network. The circuitry is configured to receive via one of the ports a packet that originated from a source node and is destined to a destination node, the packet including a mark that is indicative of a cumulative state derived from at least bandwidth utilization conditions of output ports that were traversed by the packet along a path, from the source node up to the network element, to select a port for forwarding the packet toward the destination node, to update the mark of the packet based at least on a value of the mark in the received packet and on a local bandwidth utilization condition of the selected port, and to transmit the packet having the updated mark to the destination node via the selected port.

26 Claims, 5 Drawing Sheets

(51) Int. Cl.
*H04L 47/12* (2022.01)
*H04L 1/00* (2006.01)

(56) References Cited

U.S. PATENT DOCUMENTS

| | | | |
|---|---|---|---|
| 7,272,111 | B2 | 9/2007 | Zukerman et al. |
| 7,796,507 | B2 | 9/2010 | Gholmieh et al. |
| 9,948,565 | B2 | 4/2018 | Zhovnirnovsky et al. |
| 10,097,479 | B1* | 10/2018 | Thomas .................. H04L 49/30 |
| 2006/0203730 | A1* | 9/2006 | Zur ....................... H04L 47/263 |
| | | | 370/395.43 |
| 2007/0153695 | A1* | 7/2007 | Gholmieh ............... H04L 47/10 |
| | | | 370/235 |
| 2008/0025217 | A1* | 1/2008 | Gusat ..................... H04L 47/10 |
| | | | 709/225 |
| 2008/0298248 | A1* | 12/2008 | Roeck ................... H04L 49/505 |
| | | | 370/237 |
| 2011/0205898 | A1* | 8/2011 | Ichiki .................... H04L 47/122 |
| | | | 370/252 |
| 2017/0272372 | A1* | 9/2017 | Gafni ...................... H04L 47/32 |
| 2018/0234343 | A1* | 8/2018 | Zdornov ............... H04L 47/621 |
| 2019/0342217 | A1* | 11/2019 | Mazurek ............. H04L 67/1097 |
| 2019/0379610 | A1* | 12/2019 | Srinivasan .......... H04L 47/6255 |

OTHER PUBLICATIONS

Braden et al. "Recommendations on Queue Management and Congestion Avoidance in the Internet," Request for Comments (RFC) 2309, pp. 1-17, Apr. 1998.

Infiniband Trade Association, "InfiniBand™ Architecture Specification", vol. 1, Release 1.3, pp. 1-1842, Mar. 3, 2015.

* cited by examiner

EXPLICIT NOTIFICATION OF OPERATIVE CONDITIONS ALONG A NETWORK PATH

CROSS-REFERENCE TO RELATED APPLICATIONS

This application claims the benefit of U.S. Provisional Patent Application 63/019,355, filed May 3, 2020, whose disclosure is incorporated herein by reference.

TECHNICAL FIELD

Embodiments described herein relate generally to data communication networks, and particularly to methods and systems for explicit notification of operative conditions along a network path.

BACKGROUND

Traffic traversing communication networks is sometimes subject to network congestion. Various techniques for detecting and controlling congestion are known in the art.

For example, Ramakrishnan et al. describe congestion control techniques that use Explicit Congestion Notification (ECN), in a Request for Comments (RFC) 3168 of the Internet Engineering Task Force (IETF), entitled "The Addition of Explicit Congestion Notification (ECN) to IP," September, 2001.

SUMMARY

An embodiment that is described herein provides a network element that includes circuitry and multiple ports. The multiple ports are configured to connect to a communication network. The circuitry is configured to receive via one of the ports a packet that originated from a source node and is destined to a destination node, the packet including a mark that is indicative of a cumulative state derived from at least bandwidth utilization conditions of output ports that were traversed by the packet along a path, from the source node up to the network element, to select a port for forwarding the packet toward the destination node, to update the mark of the packet based at least on a value of the mark in the received packet and on a local bandwidth utilization condition of the selected port, and to transmit the packet having the updated mark to the destination node via the selected port.

In some embodiments, the cumulative state is derived from both the bandwidth utilization conditions and from congestion conditions of the output ports that were traversed by the packet along the path, and the circuitry is configured to update the mark based on both the local bandwidth utilization condition and on a local congestion condition of the selected port. In other embodiments, the mark is indicative of whether the path from the source node up to the network element is in a cumulative state selected from a list of cumulative states consisting at least: (i) a cumulative congestion state, in which one or more preceding ports along the path are congested, (ii) a cumulative normal state, in which all preceding ports along the path are uncongested and at least one of the preceding ports along the path is not underutilized, and (iii) a cumulative underutilization state, in which all preceding ports along the path are underutilized. In yet other embodiments, the mark in the received packet is indicative of the cumulative congestion state, and the circuitry is configured to retain the mark in the received packet in the cumulative congestion state, independently of the local congestion condition and of the local bandwidth utilization condition of the selected port.

In an embodiment, the circuitry is configured to, in response to detecting an imminent local congestion condition of the selected port, set the mark in the packet to the cumulative congestion state, independently of the local bandwidth utilization condition of the selected port. In another embodiment, the mark in the received packet is indicative of the cumulative normal state, and the circuitry is configured to, in response to detecting that the selected port is uncongested, retain the mark in the received packet in the cumulative normal state. In yet another embodiment, the mark in the received packet is indicative of the cumulative underutilization state, and the circuitry is configured to, in response to detecting that the selected port is uncongested, set the mark in the received packet based on the local bandwidth utilization condition of the selected port.

In some embodiments, the circuitry is configured to retain the mark in the received packet in the cumulative underutilization state, in response to detecting that the selected port is underutilized. In other embodiments, the circuitry is configured to measure a bandwidth of data transmitted by the selected port, and to determine the local bandwidth utilization condition of the selected port, by applying a probabilistic function to the measured bandwidth. In yet other embodiments, the mark reuses a field in a header of the packet that is used by a given protocol only for congestion notification.

There is additionally provided, in accordance with an embodiment that is described herein, a method, including, in a network element that includes multiple ports that connect to a communication network, receiving via one of the ports a packet that originated from a source node and is destined to a destination node, the packet including a mark that is indicative of a cumulative state derived from at least bandwidth utilization conditions of output ports that were traversed by the packet along a path, from the source node up to the network element. A port is selected for forwarding the packet toward the destination node. The mark of the packet is updated based at least on a value of the mark in the received packet and on a local bandwidth utilization condition of the selected port. The packet having the updated mark is transmitted to the destination node via the selected port.

There is additionally provided, in accordance with an embodiment that is described herein, a network node that includes a network adapter and a host processor. The network adapter is coupled to a communication network. The host processor is coupled to the network adapter, and configured to receive from a remote node that is coupled to the communication network via the network adapter, a packet including a mark that is indicative of a cumulative state derived from at least bandwidth utilization conditions of output ports that were traversed by the packet along a path, from the network node to the remote node, and to adjust a rate of data transmission by the host processor into the communication network based on the mark in the received packet.

In some embodiments, the cumulative state is derived from both the bandwidth utilization conditions and from congestion conditions of the output ports that were traversed by the packet along the path. In other embodiments, the mark is indicative of whether the path from the network node to the remote node is in a cumulative state selected from a list of cumulative states consisting at least: (i) a cumulative congestion state, in which one or more ports along the path are congested, (ii) a cumulative normal state, in which all the ports along the path are uncongested and at least one of the ports along the path is not underutilized, and (iii) a cumulative underutilization state, in which all the ports along the path are underutilized.

In an embodiment, the host processor is configured to, responsively to the mark being indicative of the cumulative underutilization state, increase the rate of data transmission into the communication network. In another embodiment, the host processor is configured to, responsively to the mark being indicative of the cumulative normal state, increase the rate of data transmission into the communication network at a first pace, and responsively to the mark being indicative of the cumulative underutilization state, increase the rate of data transmission to the communication network at a second pace that is faster than the first pace.

There is additionally provided, in accordance with an embodiment that is described herein, a method including, in a network node, receiving by a host processor, a packet sent from a remote node over a communication network, the packet comprising a mark that is indicative of a cumulative state derived from bandwidth utilization conditions of output ports that were traversed by the packet along a path, from the network node to the remote node. A rate of data transmission into the communication network is adjusted, by the host processor, based on the mark in the received packet.

These and other embodiments will be more fully understood from the following detailed description of the embodiments thereof, taken together with the drawings in which:

DETAILED DESCRIPTION OF EMBODIMENTS

Overview

Figure 1:
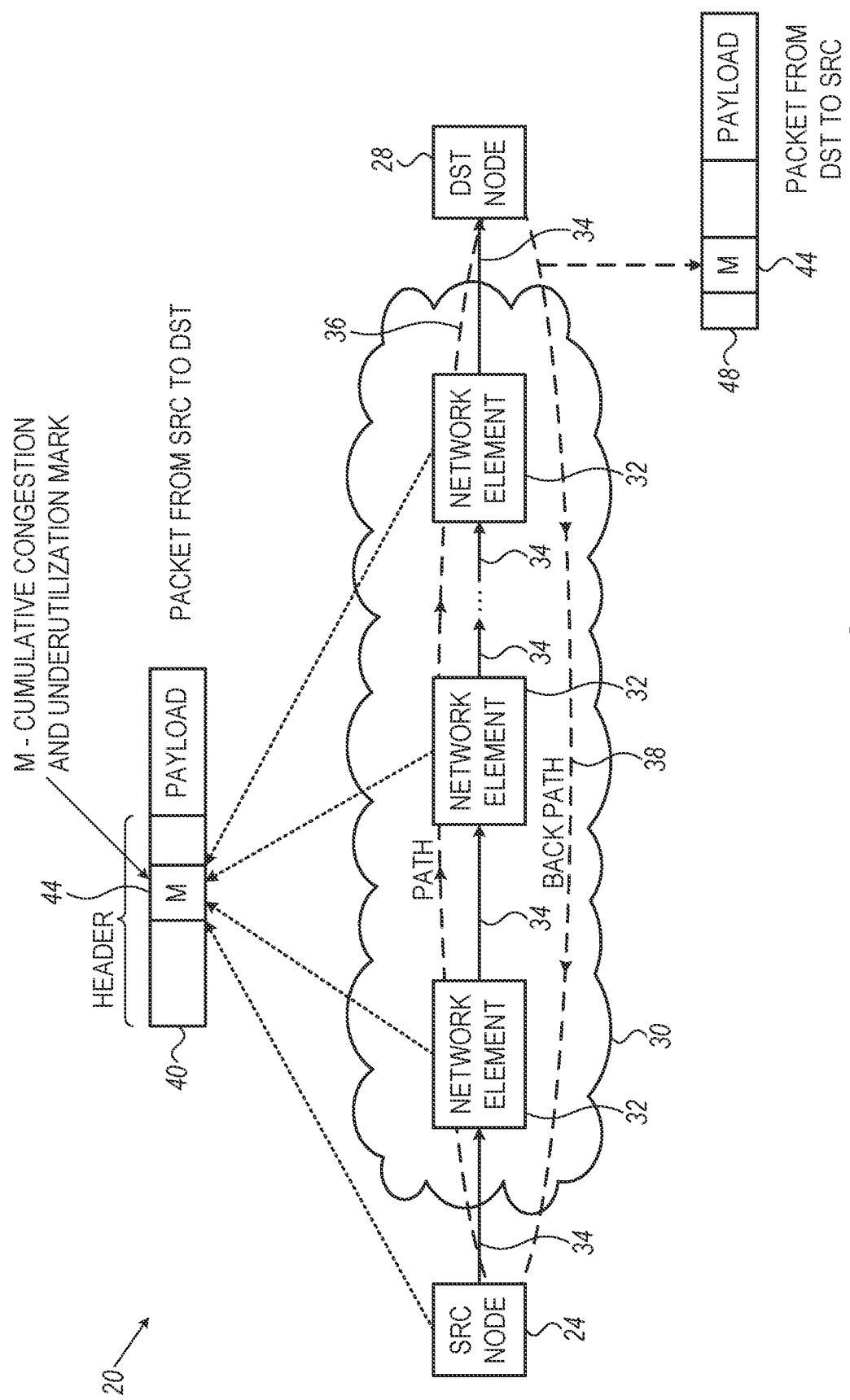
FIG. 1 is a block diagram that schematically illustrates a communication system in which a source node adjusts transmission rate based on a cumulative bandwidth utilization and congestion state, in accordance with an embodiment that is described herein.

In various applications such as High-Performance Computing (HPC) and data centers, a network congestion may occur due to multiple network nodes injecting high-rate data into the network concurrently. Methods for mitigating network congestion are referred to collectively as "congestion control" methods.

Embodiments that are described herein provide methods and systems for adjusting the transmission rate of network nodes by cumulating information regarding the bandwidth utilization and congestion conditions of ports along a network path.

In terms of network performance, the requirements for maximizing bandwidth utilization and avoiding congestion are both important but are typically conflicting. In principle, a source node could gradually increase the transmission rate until detecting congestion, and then reduce the transmission rate aggressively, e.g., by half, to relieve the congestion. Since, however, one or more source nodes would react to a common congestion by first sharply decreasing and then gradually increasing the transmission rate, the network remains poorly utilized for long periods of time. Moreover, some of the flows that caused the congestion may terminate over time, which results in freeing additional bandwidth that could be utilized by other flows.

In the disclosed embodiments, a novel end-to-end protocol is specified, that explicitly notifies the source node of a cumulative state derived from both bandwidth utilization and congestion conditions of ports in network elements along the path from the source node to the destination node. The disclosed embodiments provide both congestion avoidance and improved bandwidth utilization in the network.

In the present context, congestion in an output port is a condition in which the data rate of traffic that is provided to the port exceeds the port capacity ("line rate"). An output port may become congested, for example, when serving one or more queues that fill up at a combined rate higher than the port capacity. In the present context, an output port is underutilized when transmitting at a rate lower than the port capacity. In some occasions, e.g., in lossy networks, the port is underutilized when transmitting at a rate lower rate than the port capacity while no queue served by the port is building up. It should be noted that bandwidth utilization is very different from congestion because, for example, (i) a port can fully utilize its bandwidth without being congested, or (ii) a port may be congested and not fully utilized (e.g., because of flow control backpressure).

In some disclosed embodiments, a network element receives a packet that originated from a source node and is destined to a destination node. The received packet comprises a mark that is indicative of a cumulative state derived at least from bandwidth utilization conditions of output ports that were traversed by the packet along a path, from the source node up to the network element. The network element selects a port for forwarding the packet toward the destination node, updates the mark of the packet based on a value of the mark in the received packet and on a local bandwidth utilization condition of the selected port, and transmits the packet having the updated mark to the destination node via the selected port.

In some embodiments, the cumulative state is derived from both the bandwidth utilization conditions and from congestion conditions of the output ports that were traversed by the packet along the path, and the network element is configured to update the mark based on both the local bandwidth utilization condition and on a local congestion condition of the selected port.

At the destination node that receives the packet, the mark is indicative of the cumulative state of all the output ports traversed along the entire path. The destination node reports the mark back to the source node, e.g., by sending to the source node a feedback packet containing the mark. The source node adjusts the transmission rate based on the feedbacked mark.

In some embodiments, in a network element along the path, the mark is indicative of whether the path from the source node up to the network element is in one of the following states: (i) a cumulative congestion state, in which one or more preceding ports along the path are congested, (ii) a cumulative normal state, in which all preceding ports along the path are uncongested and at least one of the preceding ports along the path is not underutilized, and (iii) a cumulative underutilization state, in which all preceding ports along the path are underutilized. Alternatively, other suitable mapping between port operative conditions and cumulative states can also be used.

In some embodiments, a network element may modify the mark under certain rules. For example, in response to receiving a packet with the mark indicative of the cumulative congestion state or detecting an imminent local congestion condition of the selected port, the network element sets the mark to indicate the cumulative congestion state, independently of its local bandwidth utilization and congestion conditions. With this rule, the cumulative congestion state of the entire path is the cumulative congestion state when one or more of the ports traversed along the path are congested.

When the mark in the received packet is not indicative on the cumulative congestion state and the selected port is uncongested, the network element sets the mark based on the mark in the received packet and on the bandwidth utilization condition of the selected port. For example, when the mark in the received packet is indicative of the cumulative normal state, the network element retains the mark in the cumulative normal state. This means that the cumulative state of the path is the cumulative normal state when all output ports traversed along the path are uncongested and at least one of the ports along the path is not underutilized.

Otherwise, the mark in the received packet is indicative of the cumulative underutilization state, and the network element retains the mark in the cumulative underutilization state in response to detecting that the selected port is underutilized, and sets the mark to the cumulative normal state otherwise. In using this rule, the cumulative state of the path is the cumulative underutilization state only when all the output ports traversed along the path are underutilized.

In some embodiments, the mark is implemented by reusing a field in a header of the packet that is used by a given protocol only for congestion notification. For example, the mark may be implemented by reusing the two-bit Explicit Congestion Notification (ECN) field specified in the RFC 3168 cited above.

As noted above, a source node receiving a feedbacked mark adjusts its transmission rate based on the reported mark value. In some embodiments, the mark is indicative of a cumulative state derived from at least bandwidth utilization conditions of output ports that were traversed by the packet along a path, from the network node to the remote node. In other embodiments, the cumulative state is derived from both the bandwidth utilization conditions and from congestion conditions of the output ports that were traversed by the packet along the path.

In some embodiments, in response to a mark that is indicative of the cumulative congestion state, the source node decreases the transmission rate to relieve the congestion, and otherwise increases the transmission rate to increase bandwidth utilization. In some embodiments, the source node increases the transmission rate at a first pace when the mark indicates the cumulative normal state, and at a second faster pace when the mark indicates the cumulative underutilization state.

In the disclosed techniques, a dedicated mark in a packet's header cumulates path state information regarding the bandwidth utilization and congestion conditions of output ports that were traversed by the packet along a network path. The resulting cumulative state of the entire path is used for adjusting the transmission rate by the source node. In one embodiment, based on the cumulative state, the source node (i) reduces the transmission rate when at least one output port along the path is congested, (ii) increases the transmission rate at a first pace when at least one out port along the path is not underutilized and (iii) increases the transmission rate at a second faster pace when all the output ports along the path are underutilized. By using the disclosed embodiments, network bandwidth is utilized better than in known congestion control methods.

System Description

FIG. 1 is a block diagram that schematically illustrates a communication system 20 in which a source adjusts transmission rate based on a cumulative bandwidth utilization and congestion state, in accordance with an embodiment that is described herein.

In communication system 20 of FIG. 1, a network node 24 communicates with another network node 28 over a communication network 30. In the present example, network node 24 serves as a source node that sends packets to network node 28 serving as a destination node.

Figure 3:
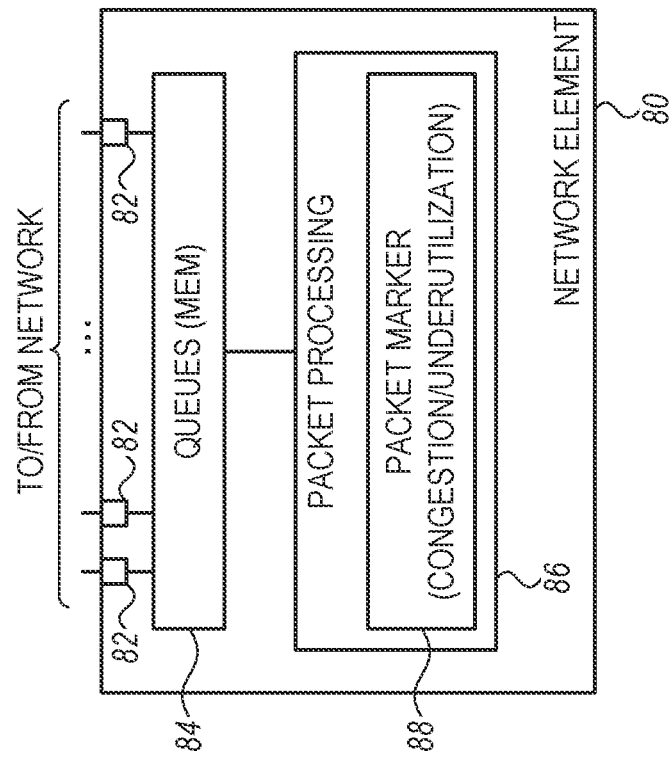
FIG. 3 is a block diagram that schematically illustrates a network element, in accordance with an embodiment that is described herein.
Figure 2:
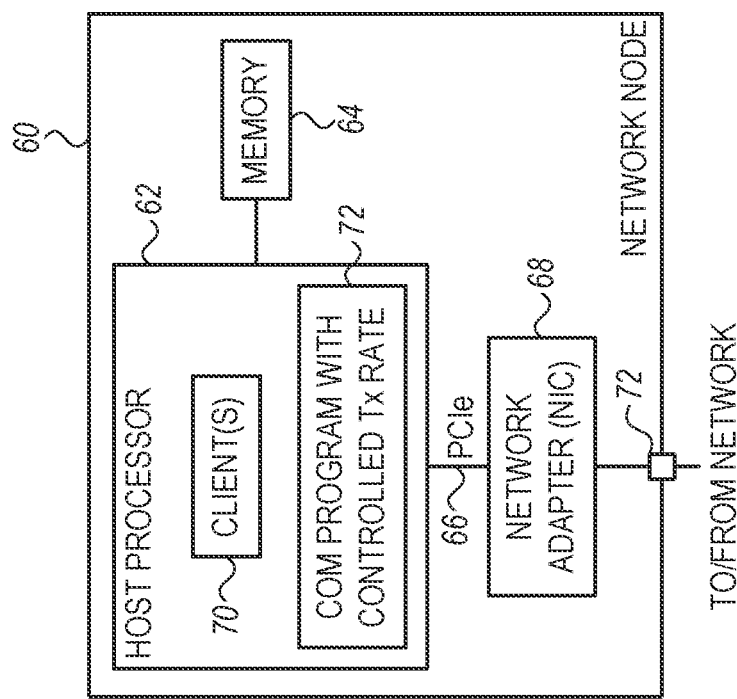
FIG. 2 is a block diagram that schematically illustrates a network node, in accordance with an embodiment that is described herein.

Communication network 30 comprises multiple network elements 32 comprising, for example, network switches, routers, or any other suitable type of a network element that forwards packets in the network. Network elements 32 connect to one another and to network nodes 24 and 28 using physical links 34 in accordance with any suitable topology. Network nodes 24 and 28 and network elements 32 connect to links 34 using ports (as shown in FIGS. 2 and 3 below). Physical Links 34 have a maximal transmission rate, also referred to as the "line rate" of the link. In the present context the port capacity is specified as the line rate of the link to which it connects. Depending on the underlying communication network and protocols, the line rate of links 34 may be between several Megabits per second up to several hundreds of Gigabits per second. The range of line rates supported is expected to increase in the future.

Communication network 30 may comprise any suitable network, operating using any suitable communication protocols. For example, communication network 30 may comprise an Ethernet network in which packets are communicated using the Transmission Control Protocol (TCP) and the Internet Protocol (IP). As another example, communication network 30 may comprise an InfiniBand™ fabric. The Converged Ethernet (RoCE) protocol is a Remote Direct Memory Access (RDMA) protocol (implementing an InfiniBand transport layer) over IP and Ethernet networks.

Communication system 20 may be used, for example, in high-rate communication applications such as, for example, in High-Performance Computing (HPC) environments, data centers, storage networks, Artificial Intelligence (AI) clusters, and in providing cloud service.

In the example of FIG. 1, source node 24 sends packets to destination node 28 over communication network 30, along a network path 36 comprising multiple network elements 32. Network nodes other than nodes 24 and 28 and network elements in communication network 30 that do not belong to network path 36 are omitted from the figure for clarity. Source node 24 receives packets (e.g., Ack packets) from detitanation node 28 over a back path 38 that typically comprises network elements 32 other than the network elements belonging to network path 36.

In some embodiments, source node 24 sends to destination node 28, via network path 36, packets 40 in which the header part of the packet comprises a mark 44. In the figure, mark 44 comprises a field in the packet's header denoted "M". Mark 44 serves as an explicit notification indicative of a cumulative bandwidth utilization and congestion state of output ports that were traversed by the packet along network path 36.

In some embodiments, the source node initializes mark 44 of a packet 40 to a cumulative state indicating that all the output ports traversed along path 36 are initially assumed to be underutilized. As the packet traverses network path 36, each network element 32 along the path may modify mark 44 based on the local bandwidth utilization and congestion conditions of the port via which the packet is forwarded. Example methods for determining the mark value in a network element will be described further below.

Destination node 28 receives a packet 40 that traversed all the network elements along network path 36. Mark 44 in the packet arriving at the destination node is therefore indicative of the cumulative bandwidth utilization and congestion state of the entire network path 36. In the present example, in response to receiving packet 40, destination node 28 sends to the source node a feedback packet 48 having a field containing the same value of mark 44 in packet 40. Alternatively, other suitable backward notification methods can also be used. Destination node 28 sends feedback packet 48 to source node 24 over back path 38. In the example of FIG. 1, feedback packet 48 contains a payload part. This, however, is not mandatory, and a feedback packet that contains a header but no payload can also be used.

Source node 24 checks mark 44 in feedback packet 48 and adjusts the transmission rate of subsequent packets 40 based on the value of mark 44. Methods for controlling the transmission rate based on mark 44 will be described in detail below.

FIG. 2 is a block diagram that schematically illustrates a network node 60, in accordance with an embodiment that is described herein.

Network node 60 of FIG. 2 may be used in implementing source node 24 of FIG. 1.

Network node 60 comprises a host processor 62, a memory 64 and a network adapter 66. In the present example, host processor 62 connects to the network adapter using a link or bus 66 such as, for example, a Peripheral Component Interconnect-Express (PCIe) bus. Network node 60 comprises a network adapter 68 for connecting to communication network 30 using a port 72. In an Ethernet network, network adapter 68 may comprise a Network Interface Card (NIC), whereas in an InfiniBand network, network adapter 68 may comprise a Host Channel Adapter (HCA).

Host processor 62 runs one or more client processes 70 (also referred to as clients or applications) and a communication program 72 that interfaces between clients 70 and network adapter 68. Communication program 72 may comprise, for example, an implementation of a suitable communication stack such as the TCP, or part thereof. In some embodiments, in the egress direction communication program 72 supports adjusting the transmission rate into the communication network, based on mark 44 in feedback packet 48. In some embodiments, communication program 72 (or part thereof) is implemented within network adapter 68, e.g., for offloading communication tasks from the host processor.

A method for controlling the transmission rate in a source node, based on the cumulative state notified by mark 44, will be described further below with reference to FIG. 5.

In an embodiment, destination node 28 may have a structure similar to that of source node 24 described above, including a host processor 62, a memory 64 and a network adapter 68. In the destination node, however, a communication program (e.g., similar to communication program 72) operating in the ingress direction, receives a packet 40 with mark 44, generates a feedback packet 48, and sends feedback packet 48 over back path 38 to the source node.

FIG. 3 is a block diagram that schematically illustrates a network element 80, in accordance with an embodiment that is described herein.

Network element 80 of FIG. 3, may be used in implementing network element 32 of communication network 30 of FIG. 1.

Network element 80 comprises ports 82 that are configured to connect to communication network 30. Each port 82 typically serves both as an input port and as an output port. Network element 80 receives packets 40 and 48 from the communication network and stores the packets in queues implemented in a memory 84. Packet processing circuitry 86 processes the received packets to be transmitted back to communication network 30. Among other tasks, packet processing circuitry 86 applies to the packets processing such as parsing, verification, forwarding and scheduling. With reference to FIG. 1 above, the processing circuitry forwards packets 40 toward the destination node and forwards packets 48 toward the source node.

In some embodiments, packet processing circuitry 86 comprises a packet marker 88 that marks each packet 40 based on local operative conditions of an output port to which packets 40 is forwarded. The operative conditions comprise, for example, local bandwidth utilization and congestion conditions. Packet marker 88 determines the value of mark 44 in an egressed packet 40, based on the mark value in the packet when received, and on the local operative conditions.

The configurations of communication system 20 of FIG. 1, network node 60 of FIG. 2 and network element 80 of FIG. 3 are example configurations, which are chosen purely for the sake of conceptual clarity. In alternative embodiments, any other suitable communication system, network node and network element configurations can also be used. Elements that are not necessary for understanding the principles of the present invention, such as various interfaces, addressing circuits, timing and sequencing circuits and debugging circuits, have been omitted from the figures for clarity.

Some elements of network element 80, such as packet processing circuitry 86, may be implemented in hardware, e.g., in one or more Application-Specific Integrated Circuits (ASICs) or FPGAs. Additionally or alternatively, packet processing circuitry 86 can be implemented using software, or using a combination of hardware and software elements. Memory 64 of network node 60 and memory 84 of network element 80 may comprise any suitable storage element such as, for example, a Random-Access Memory (RAM), a Nonvolatile (NVM) memory such as a Flash memory device. In some embodiments, memory 64, memory 84 or both comprise multiple storage elements of various storage types.

In some embodiments, some of the functions of host processor 62 and of packet processing circuitry 86 may be carried out by general-purpose processors, which are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Local Operative Conditions and Cumulative States

The local bandwidth utilization and congestion conditions of an output port can be determined using any suitable method. In some embodiments, network element 32 determines its local bandwidth utilization and congestion conditions using probabilistic functions, as described below.

Figure 4A:
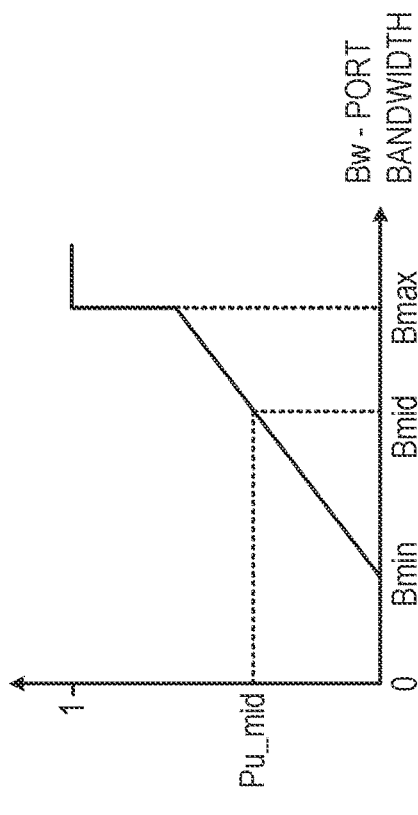
FIG. 4A is a diagram that schematically illustrates a probabilistic function used in determining a local congestion condition, in accordance with an embodiment that is described herein.

FIG. 4A is a diagram that schematically illustrates a probabilistic function used in determining a local congestion condition, in accordance with an embodiment that is described herein.

It is assumed that an output port of network element 80 (or 32) serves one or more queues. The processing circuitry typically transmits data from the queues via the output port using any suitable scheduling scheme.

The function in FIG. 4A is based on the Random Early Detection (RED) method. The RED method is described, for example, in a RFC 2309 of the Internet Engineering Task Force (IETF), entitled "Recommendations on Queue Management and Congestion Avoidance in the Internet," April, 1998.

In FIG. 4A, the horizontal axis denotes the average queue length, and the vertical axis denotes the probability of deciding that the output port serving the queue is congested. Two threshold values depicted on the horizontal axis are denoted Kmin and Kmax. In some embodiments, when the average queue length is below Kmin, packet processing circuitry 86 decides that the port is uncongested. When the average queue length is above Kmin and below Kmax (denoted Kmid), the packet processing circuitry decides that the port is congested with a probability Pc_mid that increases linearly with Kmid. When the average queue length exceeds Kmax, the packet processing circuitry decides that the port is congested with probability one.

Figure 4B:
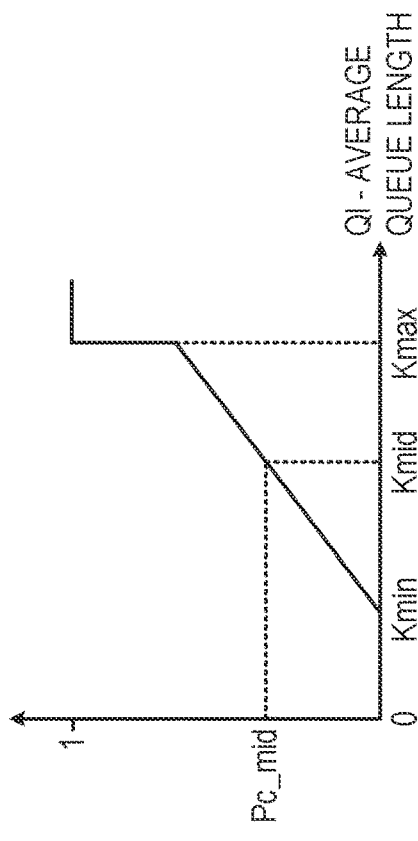
FIG. 4B is a diagram that schematically illustrates a probabilistic function used in determining a local bandwidth utilization condition, in accordance with another embodiment that is described herein.

FIG. 4B is a diagram that schematically illustrates a probabilistic function used in determining a local bandwidth utilization condition, in accordance with another embodiment that is described herein.

In FIG. 4B, the horizontal axis denotes the actual utilized bandwidth Bw of the port, and the vertical axis denotes the probability of deciding that the local port serving the queue (or queues) is not underutilized. The packet processing circuitry may measure the actual utilized bandwidth of the port using any suitable method, e.g., by measuring the amount of data transmitted via the port during a selected period. Two bandwidth threshold values depicted on the horizontal axis are denoted Bmin and Bmax. When the actual utilized bandwidth of the port is below Bmin, packet processing circuitry 86 decides that the port is underutilized. When the actual utilized bandwidth port is between Bmin and Bmax (denoted Bmid), the packet processing circuitry decides that the port is not underutilized with probability Pu_mid that increases linearly with Bmid. When the actual utilized bandwidth of the port exceeds Bmax, the packet processing circuitry decides that the port is not underutilized with probability one.

In some embodiments in which communication network 30 comprises a lossless network, a port may experience backpressure caused by flow control signaling of a subsequent network element. Consequently, it is possible that the queue served by the port builds up even when the port transmits at a rate well below the line rate (e.g., when the utilized bandwidth of the port is below Bmin). In this case, increasing the transmission rate at the source node is undesirable because it may cause congestion. In some embodiments, e.g., in lossless networks, the processing circuitry decides that the port is not underutilized when the processing circuitry detects that a queue served by the port is building up, even when the decision based on the actual utilized bandwidth was that the port is underutilized.

Note that in lossy networks the port always empties the served queues at the maximal rate available (up to the port capacity), and therefore when the port does not exploit its full capacity it means that the served queues are not filled sufficiently fast, and the port is indeed underutilized.

In some embodiments, when all the output ports that were traversed by the packet 40 along the path are underutilized, the bandwidth utilization in the network may improve by increasing the transmission rate at the source node, with reduced risk of causing congestion.

As described above, source node 24 sends packets 40 to destination node 28 along a network path 36. Packet 40 received in a network element comprises mark 44, which is indicative of a cumulative bandwidth utilization and congestion state of output ports that were traversed by the packet along the path, from the source node up to the network element.

In some embodiments, mark 44 in a packet arriving at a network element along path 36 is indicative of one of the following cumulative states (i) a cumulative congestion state, in which one or more preceding ports along the path are congested, (ii) a cumulative normal state, in which all preceding ports along the path are uncongested and at least one of the preceding ports along the path is not underutilized, and (iii) a cumulative underutilization state, in which all preceding ports along the path are underutilized.

In some embodiments, before transmitting a packet 40 to the network, the source node initializes mark 44 of the packet to the cumulative underutilization state, to indicate that all the ports along the path are initially assumed to be underutilized (and uncongested). As the packet traversing path 36, each network element in the path selects for the incoming packet an output port, and checks the local bandwidth utilization and congestion conditions of the selected port. The network element updates the mark of the packet based on the value of the mark in the received packet and on the local bandwidth utilization and congestion conditions of the selected port.

Figure 5:
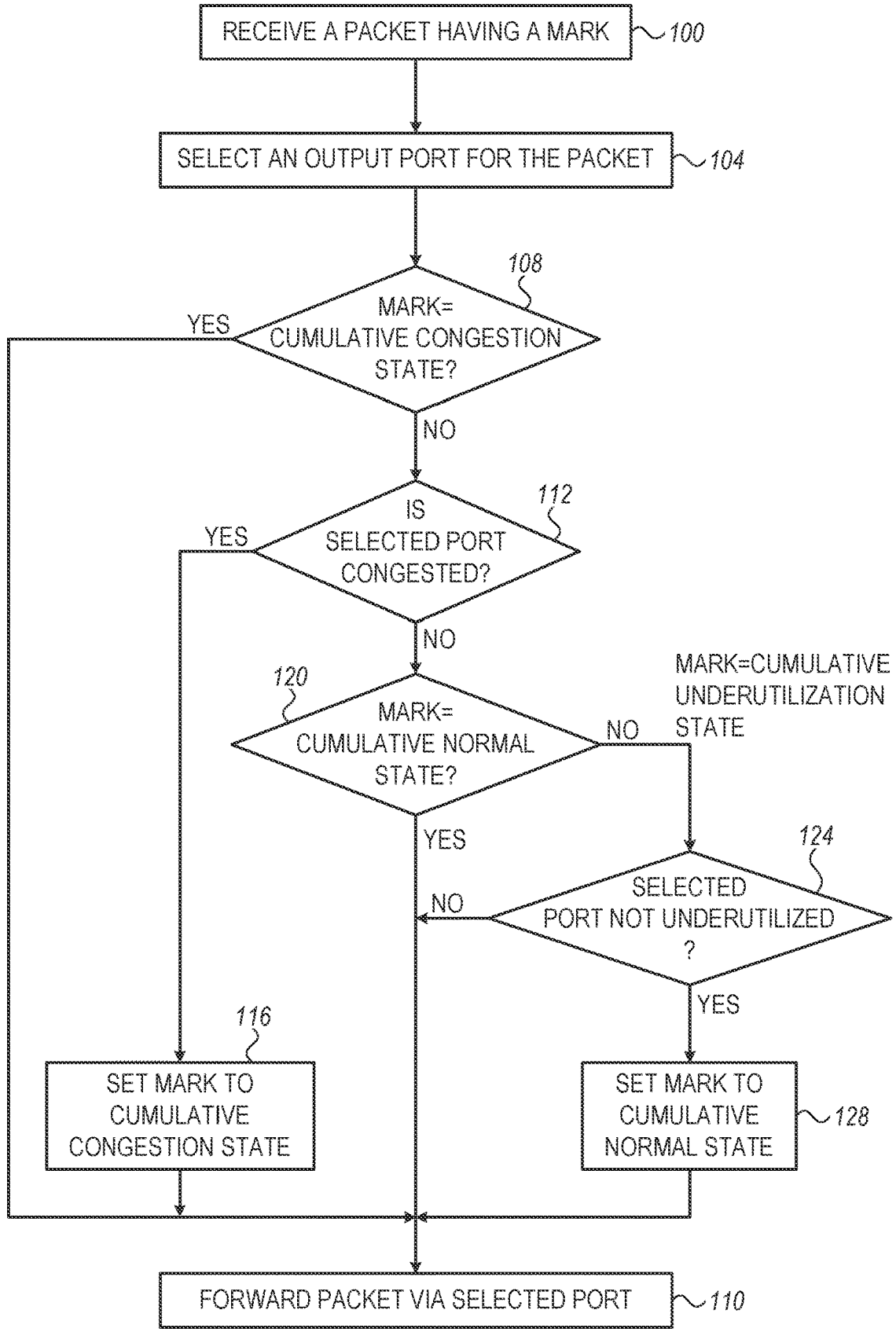
FIG. 5 is a flow chart that schematically illustrates a method for marking a packet based on bandwidth underutilization and congestion conditions of an port, in accordance with an embodiment that is described herein.

FIG. 5 is a flow chart that schematically illustrates a method for marking a packet based on local bandwidth underutilization and congestion conditions of an output port, in accordance with an embodiment that is described herein.

The method will be described as executed by elements of network element 32.

The method begins with packet processing circuitry 86 receiving a packet having a mark 44, at a reception step 100. The packet originated from source node 24 and destined via network path 36 to destination node 28. The packet processing circuitry selects for the packet an output port, e.g., based on a destination address of destination node 28 written in the packet's header, at a port selection step 104.

At a cumulative congestion query step 108, packet processing circuitry 86 checks whether mark 44 in the received packet indicates the cumulative congestion state, and if so, proceeds to a forwarding step 110, to forward the packet (without modifying the value of mark 44 in the packet) for transmission via the port selected at step 104. This means that when the output ports of one or more network elements along the path preceding the present network element are congested, the present network element may ignore the local bandwidth utilization and congestion conditions.

At a local congestion query step 112, the packet processing circuitry checks whether the selected port is congested, and if so, proceeds to a congestion marking step 116, at which the processing circuitry sets mark 44 of the packet to the cumulative congestion state, and proceeds to forward the marked packet at step 110 as described above. Note that when the selected output port is congested, the network element may ignore the local bandwidth utilization condition of the selected port.

When at step 112 the selected port is uncongested, the packet processing circuitry proceeds to a cumulative normal state query 120. At step 120 the packet processing circuitry checks whether the mark in the received packet indicates the cumulative normal state, and if so, proceeds to step 110 to forward the packet for transmission via the selected port.

Otherwise, at step 120, the mark in the received packet is indicative of the cumulative underutilization state. At an underutilization query step 124, the packet processing circuitry checks whether the selected port is not underutilized. As explained above, the port is not underutilized when the actual bandwidth of the port is high, e.g., close to the port capacity, or when detecting that one or more queues served by the port are building up. When the processing circuitry detects at step 124 that the selected port is underutilized, the packet processing circuitry proceeds to step 110 to forward the packet for transmission via the selected port. In this case the packet is forwarded with mark 44 unmodified, i.e., indicating the cumulative underutilization state.

When at step 124 the selected port is not underutilized, the packet processing circuitry proceeds to a cumulative normal state marking state 128, at which the packet processing circuitry sets mark 44 in the packet to indicate the cumulative normal state and proceeds to step 110 to forward the packet for transmission via the selected port.

Following step 110 the method terminates.

In accordance with the method of FIG. 5, any network element at any position along the path that has a congested port forces mark 44 to indicate the cumulative congestion state. Moreover, the mark indicating the cumulative congestion state remains unmodified regardless of the local bandwidth utilization and/or congestion conditions of subsequent network elements along the path. Further in accordance with the method of FIG. 5, mark 44 of the packet remains indicative of the cumulative normal state when all subsequent output ports along the path are uncongested and at least one of the subsequent output ports along the path is not underutilized. Moreover, mark 44 retains the cumulative underutilization state only when all subsequent output ports along the path are underutilized.

Methods for Implementing the Packet Mark

In some embodiments, mark 44 that is indicative of a cumulative bandwidth underutilization and congestion state is implemented using a two-bit field in the packet header. For example, mark 44 may replace a two-bit ECN field used in the ECN protocol of RFC 3168 cited above. The four possible values of mark 44 may be specified as follows. A mark value '00' indicates that the mark is unsupported, and the mark values '01', '10' and '11' indicate the cumulative underutilization state, the cumulative normal state, and the cumulative congestion state, respectively. Table 1 below summarizes the setting of the two-bit mark field based on its value in the received packet and on the local bandwidth utilization and congestion conditions.

TABLE 1

Mark value in output packet as a function of the mark value in received packet and the local bandwidth utilization and congestion conditions.

| Mark value in received packet | Local port congestion condition | Local port utilization condition | Mark value in output packet |
|---|---|---|---|
| '00' Unsupported | X | X | '00' |
| '01' Cumulative underutilization state | Uncongested | Underutilized | '01' |
|  |  | Not Underutilized | '10' |
|  | Congested | X | '11' |
| '10' cumulative normal state | Uncongested | X | '10' |
|  | Congested | X | '11' |
| '11' cumulative congestion state | X | X | '11' |

In Table 1, the symbol 'X' indicates that the relevant local bandwidth utilization and congestion conditions of the port may be ignored in determining the value of mark 44 in the egressed packet.

In some embodiments, the underlying communication network comprises an InfiniBand fabric. In such embodiments, a congestion notification referred to as a Forward Explicit Congestion Notification (FECN) is carried in a packet header denoted Based Transport Header (BTH). Packets supporting the FECN bit are sent from the source node to the destination node. In some embodiments, mark 44 can be implemented in an InfiniBand network by extending the single bit FECN into a multibit field in which the various mark states are encoded, e.g., using the encoding depicted in Table 1 above.

In the embodiments described above, mark 44 is determined mainly on operative conditions of ports along the path. Specifically, the ports are checked to be congested or uncongested and/or underutilized or not underutilized. In some embodiments, mark 44 is extended to be indicative of a high-resolution cumulative bandwidth utilization and congestion state. This may be done, for example, by specifying more than two congestion levels and/or more than two bandwidth utilization levels.

In an example embodiment, mark 44 comprises an extended FECN field in which the Most Significant Bit (MSB) is assigned to the original FECN bit. The states of this mark that are encoded with the MSB set to a logical value '0' are indicative of multiple bandwidth utilization levels, and the states that are encoded with the MSB set to a logical value '1' are indicative of multiple congestion levels. This embodiment can be implemented to be compatible with InfiniBand switches and HCAs supporting only the single bit FECN notification.

Methods for Sending the Bandwidth Utilization and Congestion State Back to the Source Node As described above, in some embodiments, destination node 28 sends back to the source node a feedbacked mark, e.g., in a feedback packet 48, for notifying the cumulative state of the path to the source node. The destination node may carry information related to the cumulative bandwidth utilization and congestion state (indicated by mark 44 of packet 40) in various ways.

In Ethernet networks with the TCP serving as the transport protocol, the destination node may set the TCP[ECE] flag (which is a single bit flag) to indicate to the source node that it has received a packet with mark 44 indicating a cumulative congestion state. In embodiments that support states of a mark that include bandwidth utilization information, another bit (e.g., a reserved bit) in the TCP header is required.

A destination node supporting mark 44 may report the state to the source node using the following approaches:

The destination node indicates a cumulative congestion state using the TCP[ECE] flag and a cumulative bandwidth utilization state via the TCP[NS] flag, in the TCP header of Ack feedback packets (48). In this case the cumulative congestion state and the cumulative bandwidth utilization state are reported using different TCP flags.

The destination node sends to the source node a dedicated message containing mark 44 as an explicit bandwidth utilization and congestion notification. A legacy source node will ignore this message, whereas a source node configured to interpret the message adjusts the transmission rate according to the explicit notification. An example method for adjusting the transmission rate will be described with reference to FIG. 6 below.

The Remote Direct Memory Access (RDMA) over Converged Ethernet (RoCE) protocol supports RDMA over an Ethernet network. The RoCE protocol supports a congestion control method in which the destination node reports congestion to the source node using a Congestion Notification Packet (CNP). The CNP comprises a 16-byte reserved field that can be used for carrying a cumulative bandwidth utilization and congestion state as indicated by mark 44. Alternatively, other packet types (e.g., in addition to the CNP) may be specified for reporting the cumulative state.

In InfiniBand networks, a destination node reports congestion to the source node by setting the Backwards Explicit Congestion Notification (BECN) bit in the packet header. The BECN bit can be carried, for example, in a CNP (similarly to RoCE) or in an ACK packet. In an example embodiment, the BECN bit is extended into a multibit field that carries the cumulative bandwidth utilization and congestion state of mark 44. In another embodiment, other packet types (e.g., in addition to the CNP) are specified for reporting the cumulative state.

Methods for Adjusting Transmission Rate in a Source Node

Figure 6:
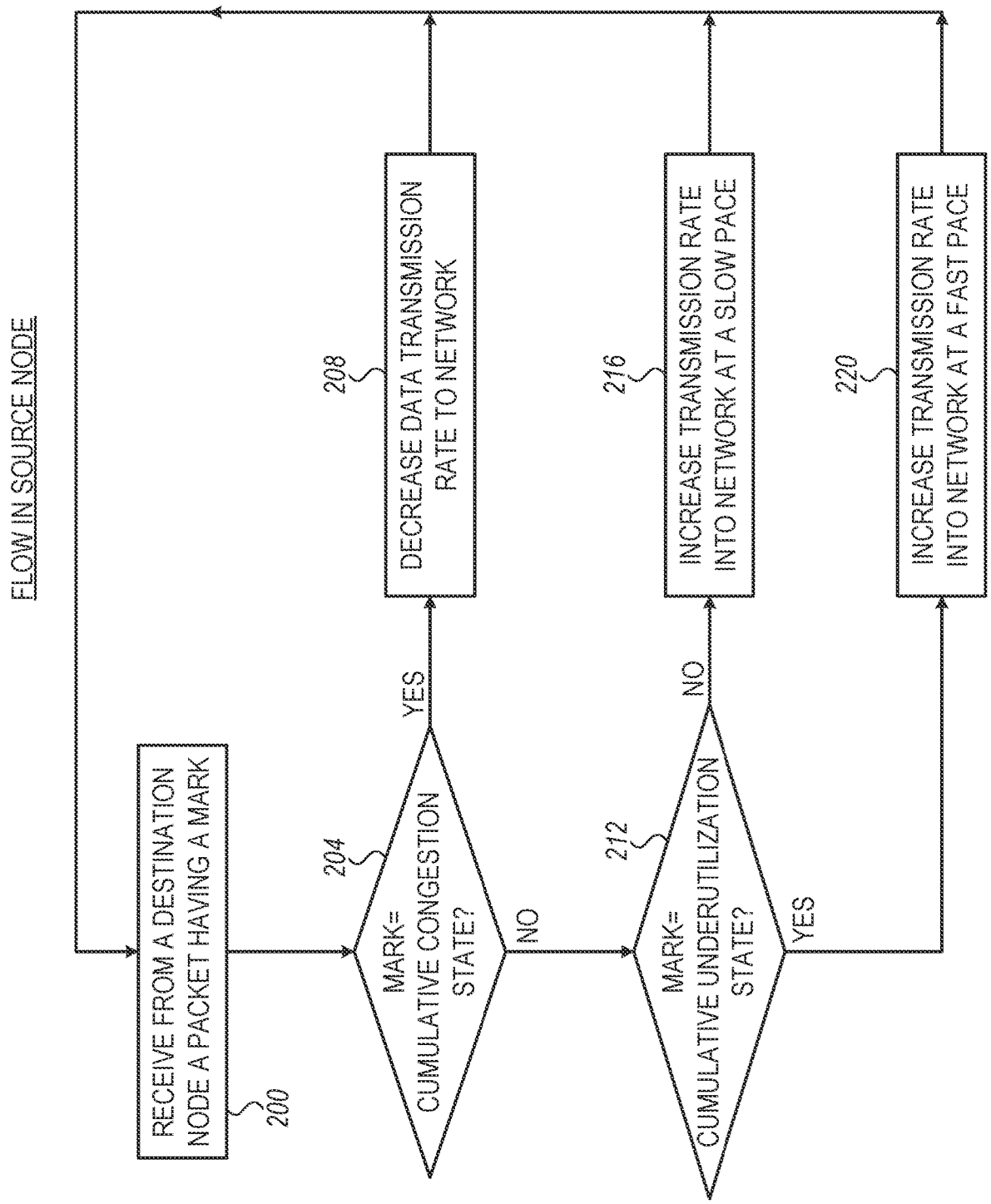
FIG. 6 is a flow chart that schematically illustrates a method for controlling the transmission rate in a source node based on explicit notification of a cumulative bandwidth utilization and congestion state, in accordance with an embodiment that is described herein.

FIG. 6 is a flow chart that schematically illustrates a method for controlling the transmission rate in a source node based on explicit notification of a cumulative bandwidth utilization and congestion state, in accordance with an embodiment that is described herein.

The method will be described as executed by host processor 62 of source node 60.

The method begins at a packet reception state 200, with communication program 72 receiving a feedback packet 48 having mark 44, from destination node 28, via back path 38. In this example, the mark is indicative of one of the following cumulative states: (i) a cumulative congestion state, in which one or more ports along the path are congested, (ii) a cumulative normal state, in which all ports along the path are uncongested and at least one of the ports along the path is not underutilized, and (iii) a cumulative underutilization state, in which all ports along the path are underutilized.

At a congestion query step 204, the communication program checks whether the mark indicates the cumulative congestion state, and if so, decreases the transmission rate into the communication network, at a rate reduction step 208, to relieve the congestion.

Otherwise, the communication program proceeds to an underutilization query step 212, at which the communication program checks whether the mark indicates the cumulative underutilization state. In response to detecting that the mark does not indicate the cumulative underutilization state (but rather indicates the cumulative normal state), the communication program proceeds to a slow pace step 216, to increase the transmission rate at the first (slow) pace. Otherwise, the mark indicates the cumulative underutilization state, and the communication program proceeds to a fast pace step 220, to increase the transmission rate at a second pace that is faster than the first pace. By using the method of FIG. 6, the network bandwidth is utilized much more effectively compared to conventional congestion control methods.

The embodiments described above are given by way of example, and other suitable embodiments can also be used. In the embodiments above, the cumulative state is mainly derived from both local bandwidth utilization conditions and local congestion conditions of the ports traversed along the path from the source node to the destination node. This, however, in not mandatory. In alternative embodiments, the cumulative state is derived from local bandwidth utilization conditions, regardless of the local congestion conditions of the ports along the path.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple ports configured to connect to a communication network; and
   circuitry configured to:
      receive via one of the ports a packet that originated from a source node and is destined to a destination node, the packet comprising a mark that is indicative of a cumulative state derived both from bandwidth utilization conditions and from congestion conditions of output ports that were traversed by the packet along a path from the source node up to the network element, wherein a local congestion condition and a local bandwidth utilization condition of at least a given output port along the path indicate that the given output port is in a state selected from a group of states comprising at least one of (i) a fully utilized but non-congested state, and (ii) a congested but underutilized state;

select a port for forwarding the packet toward the destination node;

update the mark of the packet based on a value of the mark in the received packet and on both (i) the local bandwidth utilization condition of the selected port and (ii) the local congestion condition of the selected port; and transmit the packet having the updated mark to the destination node via the selected port.

2. The network element according to claim 1, wherein the mark is indicative of whether the path from the source node up to the network element is in a cumulative state selected from a list of cumulative states comprising at least: (i) a cumulative congestion state, in which one or more preceding ports along the path are congested, (ii) a cumulative normal state, in which all preceding ports along the path are uncongested and at least one of the preceding ports along the path is not underutilized, and (iii) a cumulative underutilization state, in which all preceding ports along the path are underutilized.

3. The network element according to claim 2, wherein the mark in the received packet is indicative of the cumulative congestion state, and wherein the circuitry is configured to retain the mark in the received packet in the cumulative congestion state, independently of the local congestion condition and of the local bandwidth utilization condition of the selected port.

4. The network element according to claim 2, wherein the circuitry is configured to, in response to detecting an imminent local congestion condition of the selected port, set the mark in the packet to the cumulative congestion state, independently of the local bandwidth utilization condition of the selected port.

5. The network element according to claim 2, wherein the mark in the received packet is indicative of the cumulative normal state, and wherein the circuitry is configured to, in response to detecting that the selected port is uncongested, retain the mark in the received packet in the cumulative normal state.

6. The network element according to claim 2, wherein the mark in the received packet is indicative of the cumulative underutilization state, and wherein the circuitry is configured to, in response to detecting that the selected port is uncongested, set the mark in the received packet based on the local bandwidth utilization condition of the selected port.

7. The network element according to claim 6, wherein the circuitry is configured to retain the mark in the received packet in the cumulative underutilization state, in response to detecting that the selected port is underutilized.

8. The network element according to claim 1, wherein the circuitry is configured to measure a bandwidth of data transmitted by the selected port, and to determine the local bandwidth utilization condition of the selected port, by applying a probabilistic function to the measured bandwidth.

9. The network element according to claim 1, wherein the mark reuses a field in a header of the packet that is used by a given protocol only for congestion notification.

10. A method, comprising:

in a network element comprising multiple ports that connect to a communication network, receiving via one of the ports a packet that originated from a source node and is destined to a destination node, the packet comprising a mark that is indicative of a cumulative state derived both from bandwidth utilization conditions from congestion conditions of output ports that were traversed by the packet along a path from the source node up to the network element, wherein a local congestion condition and a local bandwidth utilization condition of at least a given output port along the path indicate that the given output port is in a state selected from a group of states comprising at least one of (i) a fully utilized but non-congested state, and (ii) a congested but underutilized state;

selecting a port for forwarding the packet toward the destination node;

updating the mark of the packet based on a value of the mark in the received packet and on both (i) the local bandwidth utilization condition of the selected port and (ii) the local congestion condition of the selected port; and transmitting the packet having the updated mark to the destination node via the selected port.

11. The method according to claim 10, wherein the mark is indicative of whether the path from the source node up to the network element is in a cumulative state selected from a list of cumulative states comprising at least: (i) a cumulative congestion state, in which one or more preceding ports along the path are congested, (ii) a cumulative normal state, in which all preceding ports along the path are uncongested and at least one of the preceding ports along the path is not underutilized, and (iii) a cumulative underutilization state, in which all preceding ports along the path are underutilized.

12. The method according to claim 11, wherein the mark in the received packet is indicative of the cumulative congestion state, and wherein updating the mark comprises retaining the mark in the received packet in the cumulative congestion state, independently of the local congestion condition and of the local bandwidth utilization condition of the selected port.

13. The method according to claim 11, wherein updating the mark comprises, in response to detecting an imminent local congestion condition of the selected port, setting the mark in the packet to the cumulative congestion state, independently of the local bandwidth utilization condition of the selected port.

14. The method according to claim 11, wherein the mark in the received packet is indicative of the cumulative normal state, and wherein updating the mark comprises, in response to detecting that the selected port is uncongested, retaining the mark in the received packet in the cumulative normal state.

15. The method according to claim 11, wherein the mark in the received packet is indicative of the cumulative underutilization state, and wherein updating the mark comprises, in response to detecting that the selected port is uncongested, setting the mark in the received packet based on the local bandwidth utilization condition of the selected port.

16. The method according to claim 15, wherein updating the mark comprises retaining the mark in the received packet in the cumulative underutilization state, in response to detecting that the selected port is underutilized.

17. The method according to claim 10, and comprising measuring a bandwidth of data transmitted by the selected port, and determining the local bandwidth utilization condition of the selected port, by applying a probabilistic function to the measured bandwidth.

18. The method according to claim 10, wherein the mark reuses a field in a header of the packet that is used by a given protocol only for congestion notification.

19. A network node, comprising:

a network adapter coupled to a communication network; and a host processor coupled to the network adapter, the host processor configured to:

receive from a remote node that is coupled to the communication network, via the network adapter, a packet comprising a mark that is indicative of a cumulative state derived both from bandwidth utilization conditions and from congestion conditions of output ports that were traversed by the packet along a path, from the network node to the remote node, wherein a local congestion condition and a local bandwidth utilization condition of at least a given output port along the path indicate that the given output port is in a state selected from a group of states comprising at least one of (i) a fully utilized but non-congested state, and (ii) a congested but underutilized state; and adjust a rate of data transmission by the host processor into the communication network based on the mark in the received packet.

20. The network node according to claim 19, wherein the mark is indicative of whether the path from the network node to the remote node is in a cumulative state selected from a list of cumulative states comprising at least: (i) a cumulative congestion state, in which one or more ports along the path are congested, (ii) a cumulative normal state, in which all the ports along the path are uncongested and at least one of the ports along the path is not underutilized, and (iii) a cumulative underutilization state, in which all the ports along the path are underutilized.

21. The network node according to claim 20, wherein the host processor is configured to, responsively to the mark being indicative of the cumulative underutilization state, increase the rate of data transmission into the communication network.

22. The network node according to claim 20, wherein the host processor is configured to, responsively to the mark being indicative of the cumulative normal state, increase the rate of data transmission into the communication network at a first pace, and responsively to the mark being indicative of the cumulative underutilization state, increase the rate of data transmission to the communication network at a second pace that is faster than the first pace.

23. A method comprising:
in a network node, receiving by a host processor, a packet sent from a remote node over a communication network, the packet comprising a mark that is indicative of a cumulative state derived both from bandwidth utilization conditions and from congestion conditions of output ports that were traversed by the packet along a path from the network node to the remote node, wherein a local congestion condition and a local bandwidth utilization condition of at least a given output port along the path indicate that the given output port is in a state selected from a group of states comprising at least one of (i) a fully utilized but non-congested state, and (ii) a congested but underutilized state; and adjusting, by the host processor, a rate of data transmission into the communication network based on the mark in the received packet.

24. The method according to claim 23, wherein the mark is indicative of whether the path from the network node to the remote node is in a cumulative state selected from a list of cumulative states comprising at least: (i) a cumulative congestion state, in which one or more ports along the path are congested, (ii) a cumulative normal state, in which all the ports along the path are uncongested and at least one of the ports along the path is not underutilized, and (iii) a cumulative underutilization state, in which all the ports along the path are underutilized.

25. The method according to claim 24, wherein adjusting the rate of data transmission comprises, responsively to the mark being indicative of the cumulative underutilization state, increasing the rate of data transmission into the communication network.

26. The method according to claim 24, wherein adjusting the rate of data transmission comprises, responsively to the mark being indicative of the cumulative normal state, increasing the rate of data transmission into the communication network at a first pace, and responsively to the mark being indicative of the cumulative underutilization state, increasing the rate of data transmission to the communication network at a second pace that is faster than the first pace.

* * * * *